US012404159B2

(12) United States Patent
Zorzella et al.

(10) Patent No.: US 12,404,159 B2
(45) Date of Patent: Sep. 2, 2025

(54) APPARATUS AND METHOD FOR CAPPING CONTAINERS

(71) Applicant: ANTARES VISION S.p.A., Travagliato (IT)

(72) Inventors: Emidio Zorzella, Brescia (IT); Massimo Bonardi, Monte Isola (IT)

(73) Assignee: ANTARES VISION S.p.A., Travagliato (IT)

( * ) Notice: Subject to any disclaimer, the term of this patent is extended or adjusted under 35 U.S.C. 154(b) by 0 days.

(21) Appl. No.: 18/251,734

(22) PCT Filed: Oct. 13, 2021

(86) PCT No.: PCT/EP2021/078265
§ 371 (c)(1),
(2) Date: May 4, 2023

(87) PCT Pub. No.: WO2022/096237
PCT Pub. Date: May 12, 2022

(65) Prior Publication Data
US 2024/0017978 A1 Jan. 18, 2024

(30) Foreign Application Priority Data
Nov. 4, 2020 (IT) ........................ 102020000026332

(51) Int. Cl.
*B67B 3/26* (2006.01)

(52) U.S. Cl.
CPC .............. *B67B 3/264* (2013.01); *B67B 3/261* (2013.01)

(58) Field of Classification Search
CPC ........... B67B 3/261; B67B 3/264; B67B 3/20; B67B 3/2033; B67B 3/2093; B67B 3/26; B67B 3/206; B65B 7/2842; B65B 7/2835
See application file for complete search history.

(56) References Cited

U.S. PATENT DOCUMENTS

2002/0148205 A1* 10/2002 Takebe ...................... B67B 3/20 53/331.5
2005/0022479 A1* 2/2005 Kitamoto ................ B67B 3/264 53/331.5

(Continued)

FOREIGN PATENT DOCUMENTS

EP 2 832 680 A1 2/2015
WO WO-2016026035 A1 * 2/2016

*Primary Examiner* — Anna K Kinsaul
*Assistant Examiner* — Himchan Song
(74) *Attorney, Agent, or Firm* — ASLAN LAW, P.C.

(57) ABSTRACT

Containers housed with random angular orientation of their thread in a first plurality of seats present circumferentially in a first rotatable carousel, caps are housed with random angular orientation of their thread in a second plurality of scats present circumferentially in a second rotatable carousel, ae current image is acquired of the thread of the container in transit through a first framing field and a current image of the thread of the cap in transit through a second framing field, a current value is calculated of the angular position of the thread of the cap in transit through the second framing field and a current value of the angular position of the thread of the container in transit through the first framing field by comparing their current image with an optical reconstruction thereof preliminarily learned, and the screwing operation is programmed with the calculated value of the current angular position.

7 Claims, 9 Drawing Sheets

(56) References Cited

U.S. PATENT DOCUMENTS

| | | | | |
|---|---|---|---|---|
| 2012/0222387 | A1* | 9/2012 | Forestelli | B67B 3/261<br>700/283 |
| 2013/0014369 | A1* | 1/2013 | Schulthess | B23P 19/105<br>29/714 |
| 2015/0033667 | A1* | 2/2015 | Cirio | B67B 3/264<br>53/329 |
| 2018/0172603 | A1* | 6/2018 | Piana | B67B 3/261 |
| 2024/0017978 | A1* | 1/2024 | Zorzella | B67B 3/261 |

* cited by examiner

APPARATUS AND METHOD FOR CAPPING CONTAINERS

CROSS-REFERENCE TO RELATED APPLICATIONS

This application claims priority to IT patent application Ser. No. 102020000026332 filed on Nov. 4, 2020, and this application claims priority to and is a 371 of international PCT Application No. PCT/EP2021/078265 filed on Oct. 13, 2021, the entire contents of which are hereby incorporated by reference.

The present invention relates to an apparatus and method for capping containers.

In bottling plants the bottles are filled with a desired liquid and closed with a cap. Said bottles comprise a neck provided with a thread and after being filled they are closed, using a capping station, with a threaded cap provided with an internal thread.

The closing of the container is finalized by the capping system through the management of the applied torque.

Closing torque that is too high can imply a certain difficulty for users to remove the cap. On the contrary, closing torque that is too low can imply incorrect closing of the container, with a consequent risk of leaks and/or deterioration of the liquid contained in the bottles.

The closing torque must be correct and constant over time, throughout production, despite the fact that threads of caps and containers each have random angular positions.

To guarantee reaching the closing torque and reaching the required production speed, the application of the cap must be performed in the shortest time possible. This is due to the fact that at the start of capping, even if the two threads are engaged with one another, the rotation of the capping head can take place "empty" for a random arc of a circle.

The torque peak only takes place after a certain random angle of rotation, which represents the position in which to block the closing and therefore to stop the rotation.

Upon detection of the peak, the detection systems internal to the capping head drive the stopping of the application of torque as quickly as possible.

This is not simple given that, as the initial position of the threads is not known, the maximum possible speed is applied in order to reduce the empty rotation time. The task proposed by the present invention is to devise an apparatus and method for capping containers that solves the drawbacks of the prior art mentioned above. Within the scope of this task it is an object of the invention to devise an apparatus and a method for capping containers with high productivity, able to offer repeatable results in compliance with the required specifications.

This task and these and other objects are achieved by a capping apparatus adapted to apply caps provided with a thread to the neck provided with a thread of containers, comprising a rotatable screwing means for screwing caps to containers, a first rotatable carousel having circumferentially a first plurality of seats where the containers can be housed with random orientation of their thread, a second rotatable carousel having circumferentially a second plurality of seats where the caps can be housed with random angular orientation of their thread, a first filming means for filming images having a first framing field oriented on the thread of the containers in sequential transit through said first framing field, a second filming means for filming images having a second framing field oriented on the thread of the caps in sequential transit through said second framing field, characterised in that it comprises processing and control means adapted to acquire from said first and second filming means at least one current image of the thread of the container in transit through said first filming field and at least one current image of the thread of the cap in transit, calculating a current value of the angular position of the thread of said cap in transit and a current value of the angular position of the thread of said container in transit, comparing said at least one current image thereof with an optical reconstruction thereof preliminarily learned, and programming the operation of the screwing means with the calculated value of the current angular position of the thread of the cap in transit and the calculated value of the current angular position of the thread of the container in transit.

The present invention also reveals a capping method wherein the caps provided with a thread are screwed to the neck provided with a thread of containers, wherein the containers are housed with random angular orientation of their thread in a first plurality of seats present circumferentially in a first rotatable carousel, the caps are housed with random angular orientation of their thread in a second plurality of seats present circumferentially in a second rotatable carousel, characterised in that it comprises acquiring at least one current image of the thread of the container in transit through a first framing field and at least one current image of the thread of the cap in transit through a second framing field, calculating a current value of the angular position of the thread of said cap in transit and a current value of the angular position of the thread of said container in transit by comparing said at least one current image thereof with an optical reconstruction preliminarily learned, and programming the screwing operation with the calculated value of the current angular position of the thread of the cap in transit and the calculated value of the current angular position of the thread of the container in transit.

The apparatus and method, based on artificial vision, enable the angular position of a cap and the angular position of the respective container to be identified, based on the detection of the threads, and such data to be communicated to the capping station.

The capping station is equipped with a rotatable carousel which supports the caps and is provided with a screwing means including capping heads which rotate the caps on themselves, and with a rotatable carousel which supports the containers which is not necessarily provided with the means for the rotation of the containers on themselves.

The angle of the two threads is communicated to the management electronics of the individual capping heads and it is thus possible to manage the closing speed and therefore the applied torque more efficiently.

For example, with information available on the cap-container angles, the capping head can move at the maximum speed for an arc of a circle for which, for geometric reasons, the closing of the container is not expected; moving closer to the closing position the capping head can slow down, obtaining greater control over the applied torque.

In substance, the capping head can move more quickly for the arc of rotation in which the closing does not take place, in order then to be able to more precisely control the torque at the time at which the closing takes place, as the capping head can rotate at a lower speed on the last angular stretch.

Advantageously, the reduction in the cap application times, due to the possibility to precisely find out the angular position of the threads, enables the use of a lower number of capping heads with the same maximum achievable production speed. Advantageously, furthermore, with a capping apparatus and method according to the invention a greater repeatability of achieving the perfect closing of the container is obtained, thanks to the greater control of the applied torque, a reduction in closing times, which can enable a reduction in the number of capping heads and overall resizing of the overall dimensions of the capping apparatus with consequent reductions in implementation and maintenance costs.

Further characteristics and advantages of the invention will more fully emerge from the description of a preferred but not exclusive embodiment of the capping apparatus and method for containers according to the invention, illustrated by way of indicative and non-limiting example in the accompanying drawings, in which.

Figure 3:
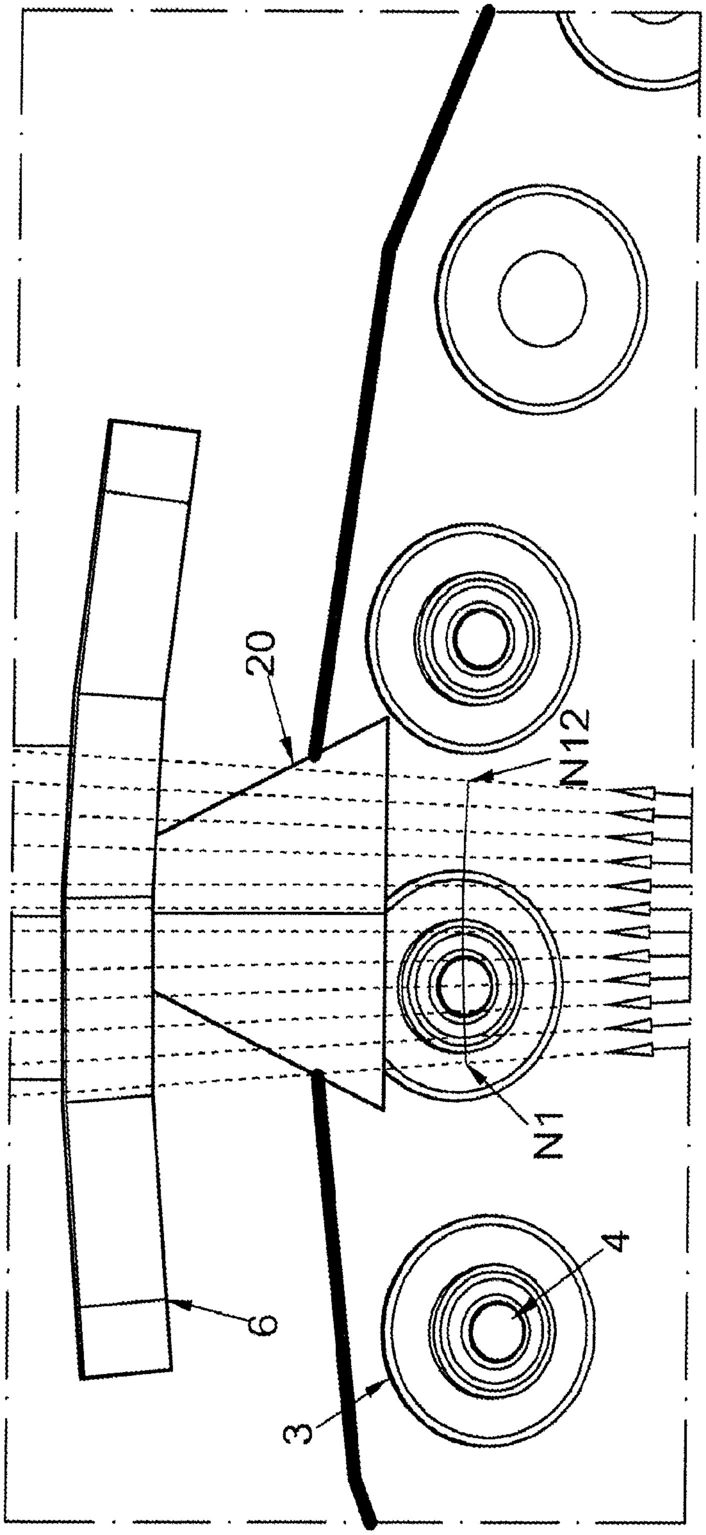
Figure 4:
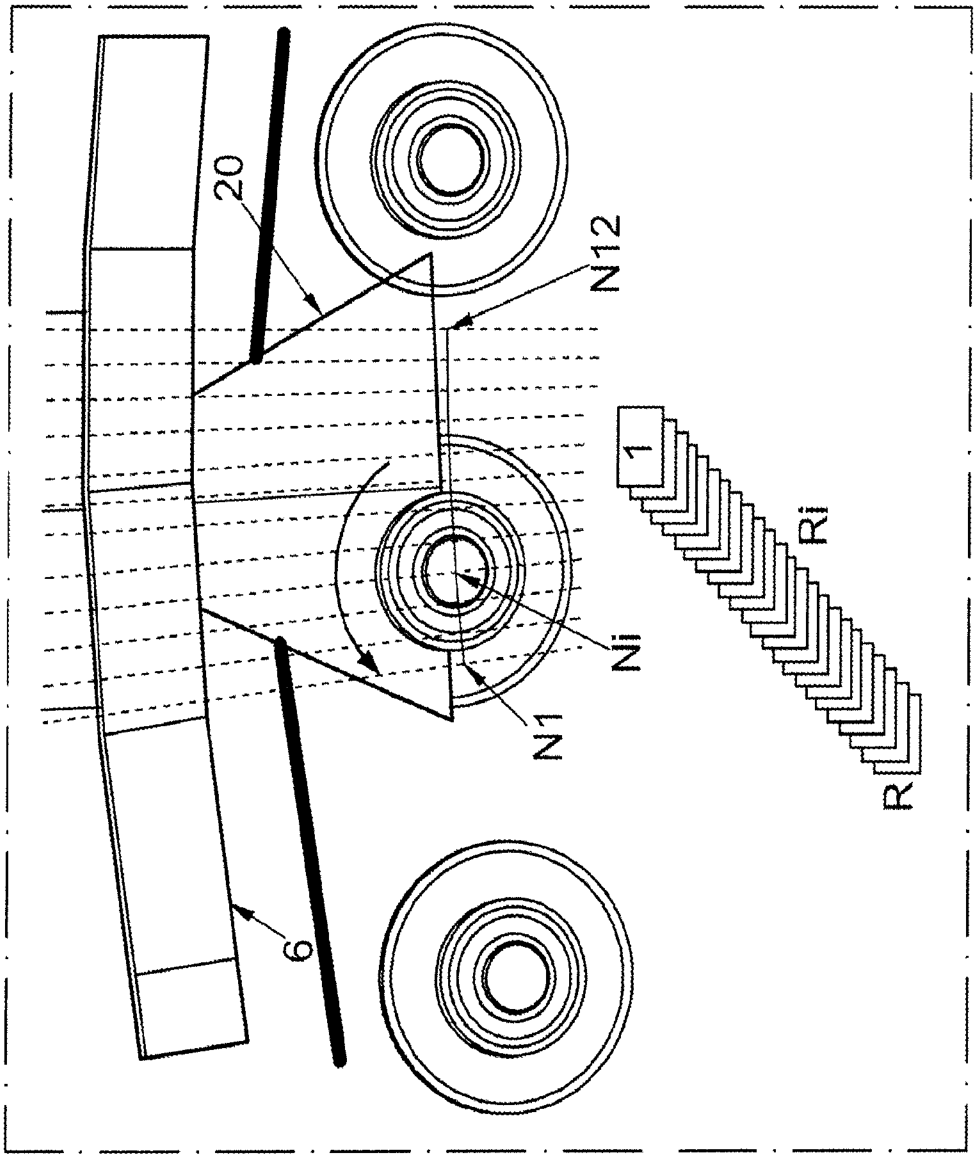
Figure 5:
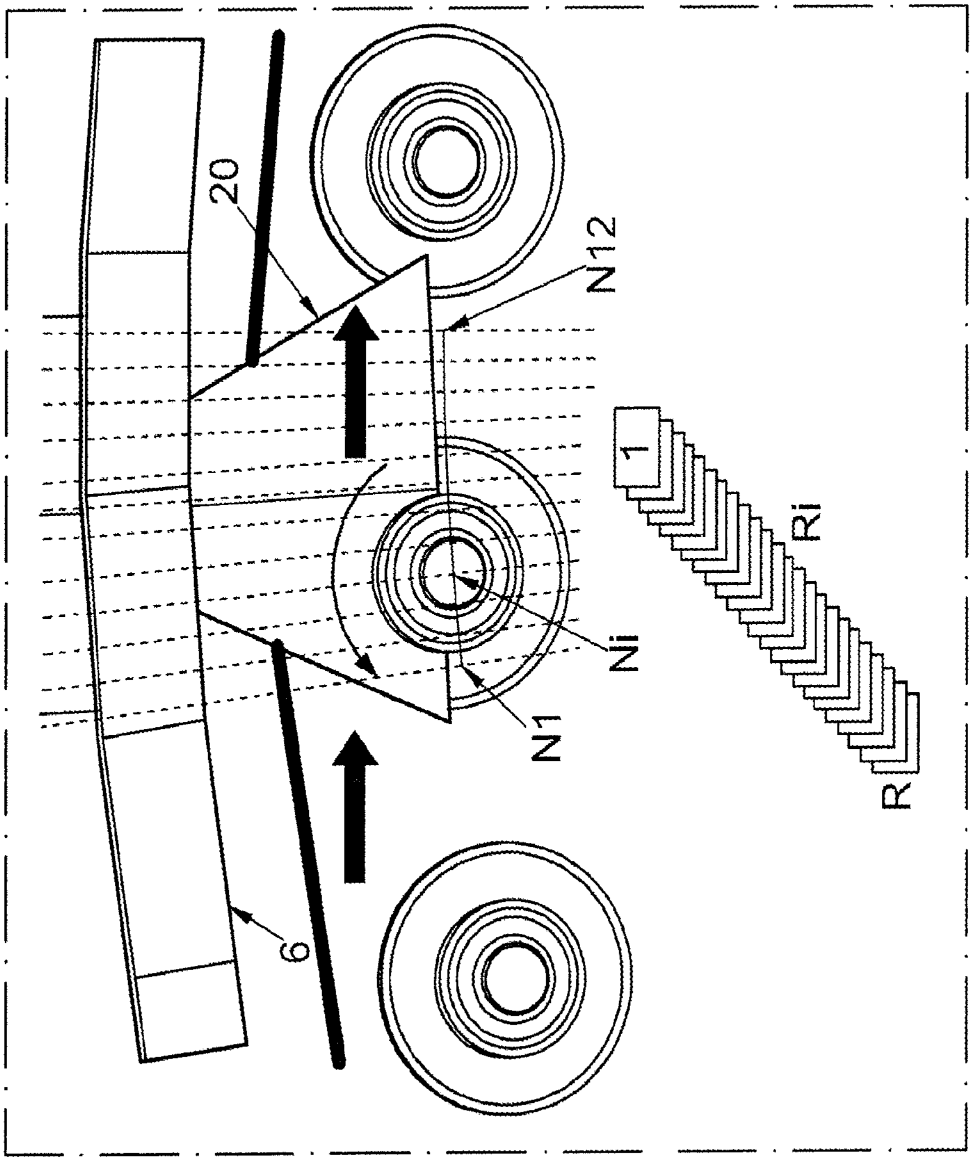
Figure 6:
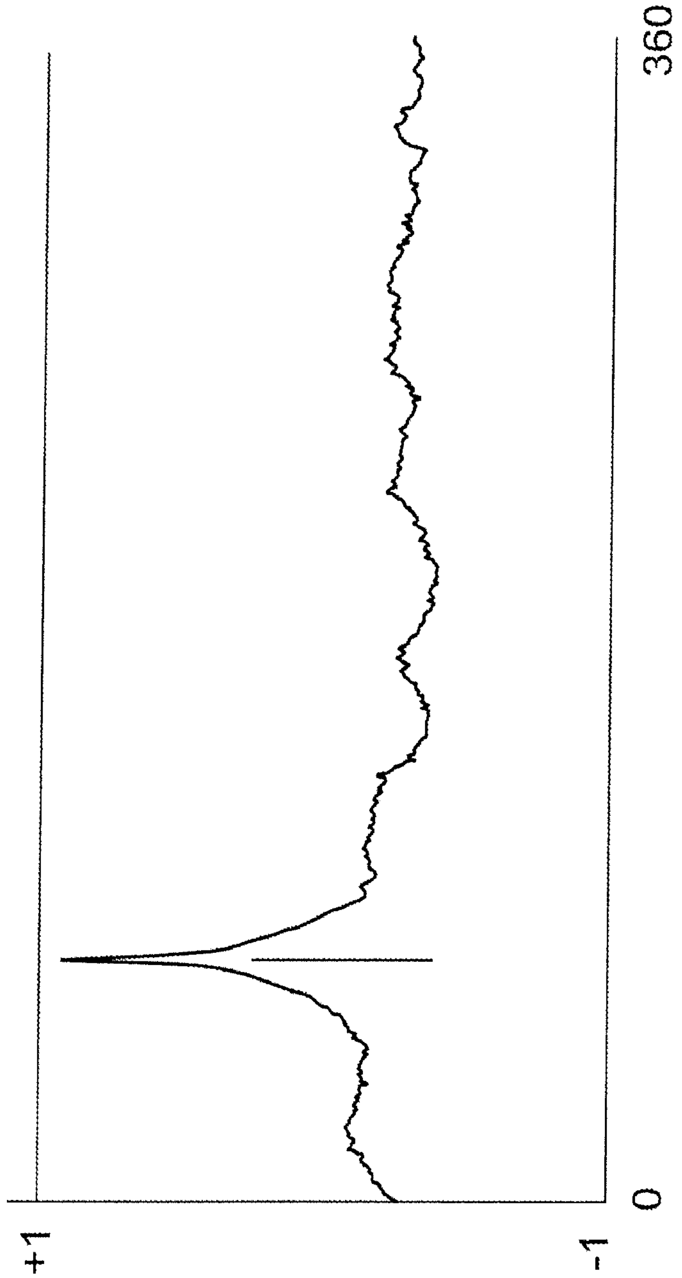
Figure 7:
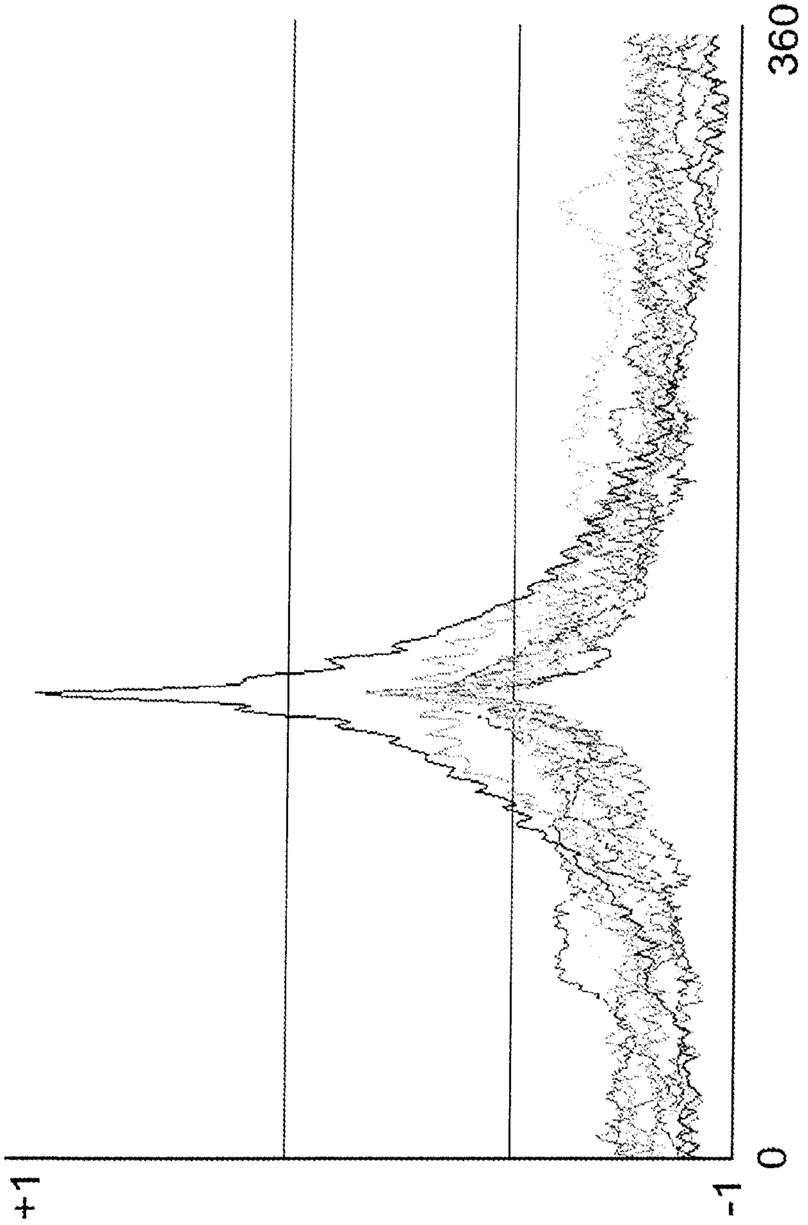
Figure 8:
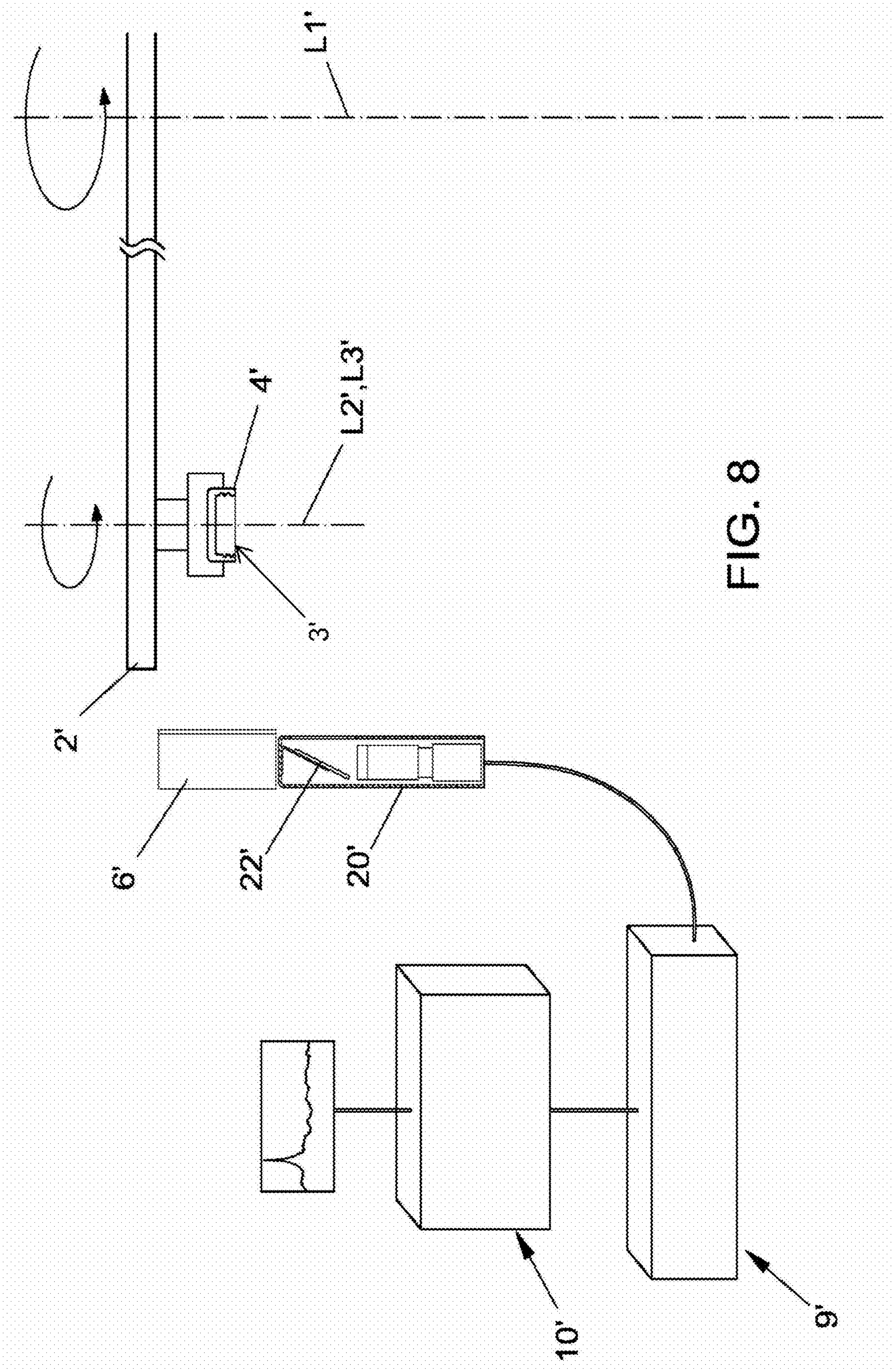
Figure 9:
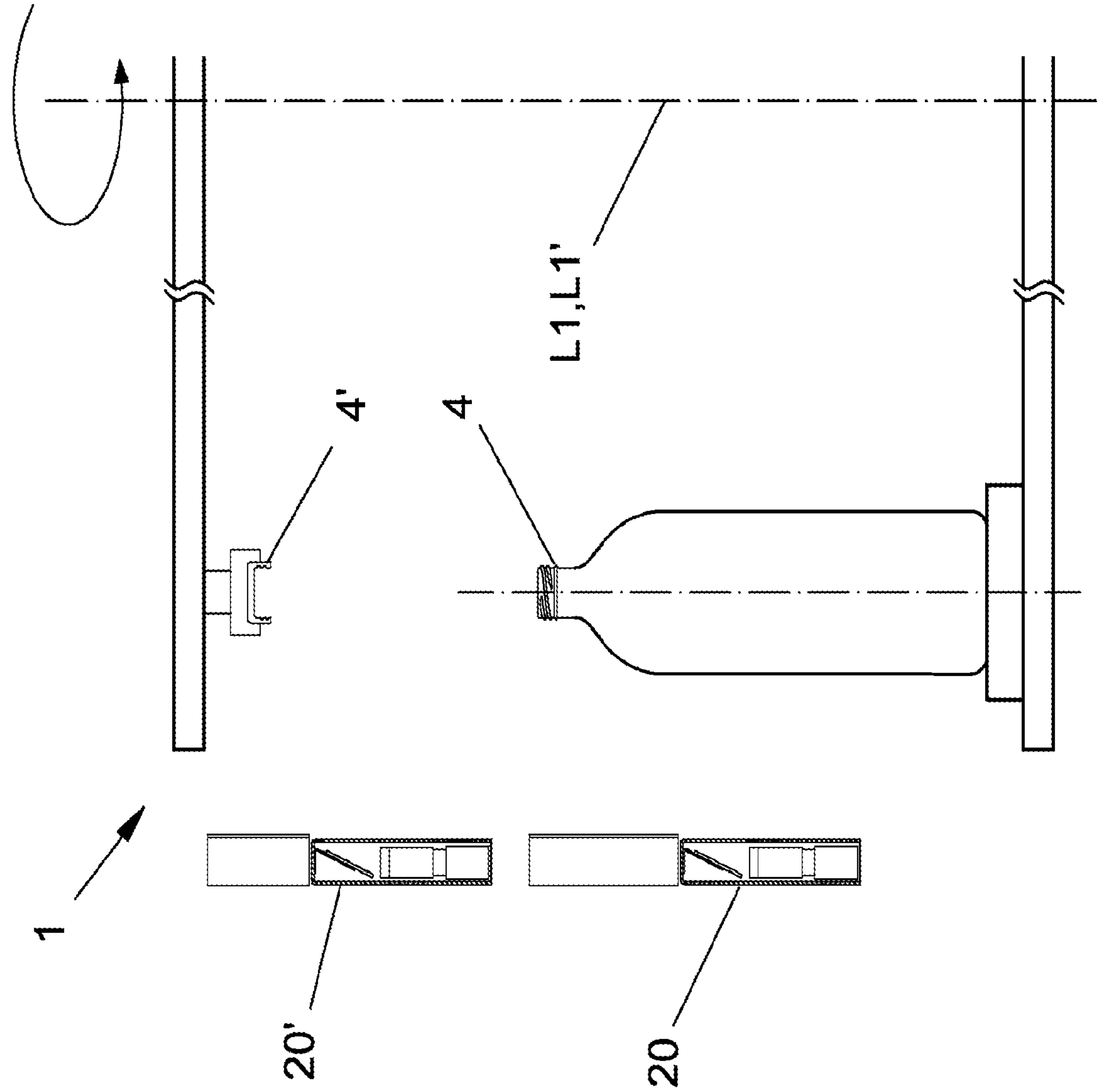

FIG. 3 schematically shows the number N of positions in which the images of the container are detected;

FIG. 4 illustrates the container learning step;

FIG. 5 shows the working step during the detection of the current angular position of the container in transit;

FIG. 6 shows a similarity graph processed with the acquired data of the angular position of the containers;

FIG. 7 graphically shows the phased peaks acquired in the various positions of the container;

FIG. 8 is a schematic side raised view of the optical reconstruction station of the caps provided with the second filming means;

FIG. 9 is a schematic side raised view of the capping station.

With particular reference to the figures disclosed above, the apparatus for capping containers is indicated overall by the reference number 1.

The apparatus 1 is used to apply a cap 4' provided with a thread to the neck provided with a thread of a container 4 made of glass or plastic, transparent or opaque, with typically at least partly cylindrical and/or conical conformation.

The apparatus 1 comprises processing and control means, indicated generically by 10, 10', a first rotatable carousel 2 and a second rotatable carousel 2'.

The first carousel 2 is rotatable about a vertical axis L1 having circumferentially a first plurality of seats 3 each supporting a corresponding container 4 oriented with a vertical axis L2.

Each seat 3 rotates about its own axis L3 also vertical and coinciding with L2, or a relevant means can be provided for the rotation of the containers 4 on themselves so that each container 4 can have a roto-revolution movement imparted thereon during which it maintains its axis with a vertical orientation.

In a predefined zone of the first carousel 2 there is an optical reconstruction station, having first filming means 20 for filming multiple sequential images of the individual container 4 during its roto-revolution motion.

In general, the optical reconstruction station is formed by one or more artificial viewing devices, provided with one or more illuminators, which produce reflected and/or transmitted light (rear illumination).

In particular, the illuminators are positioned with respect to the container with an angle of incidence adapted to maximize the amount of light reflected/transmitted by the outer surface of the container, in the thread zone.

In the solution illustrated purely by way of example, a single fixed illuminator 6 is provided and the first filming means 20 comprises a camera with a fixed reference frame.

Figure 1:
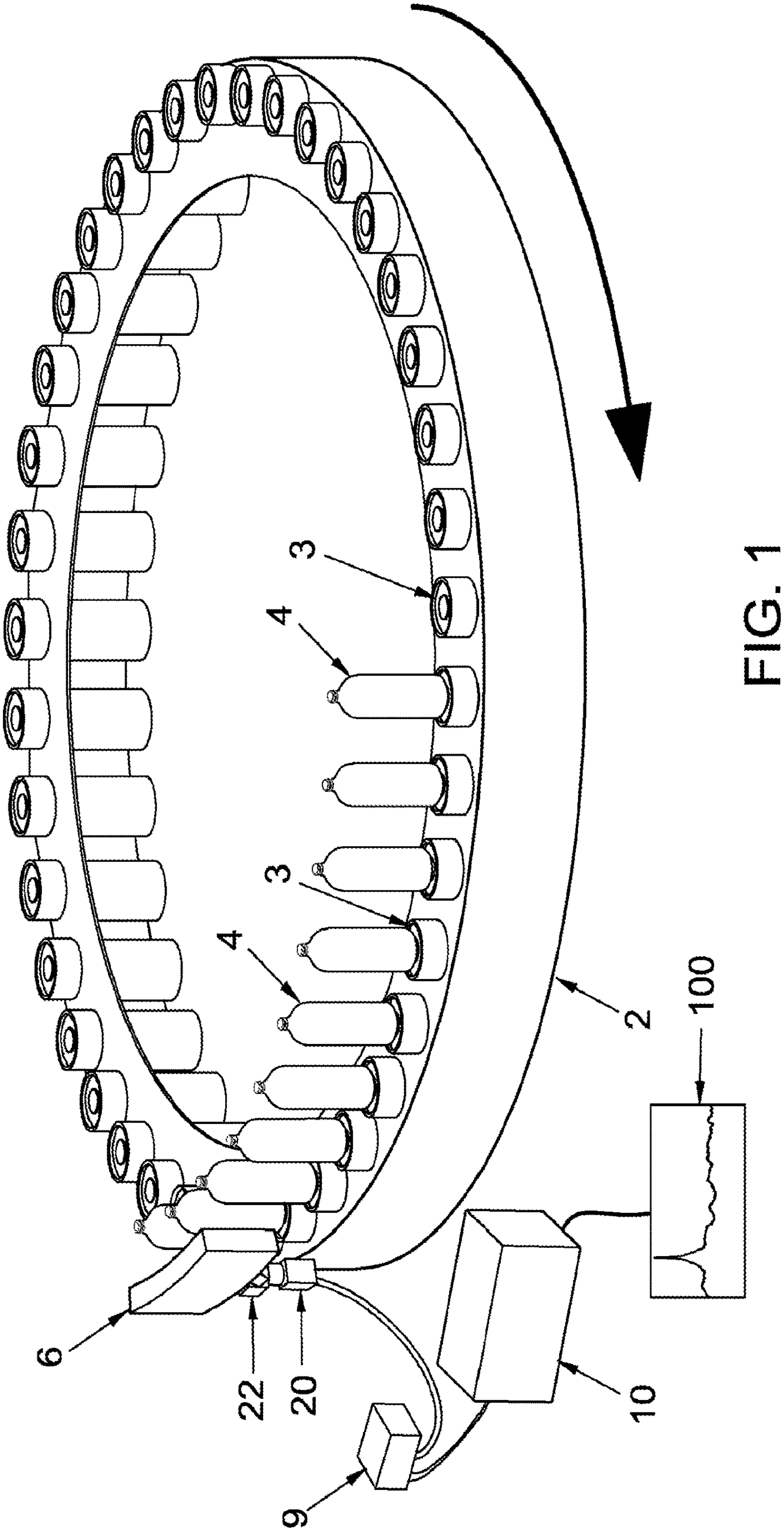
FIG. 1 is a schematic view of the device for the acquisition of the angular position of the containers in the capping apparatus according to the invention.
Figure 2:
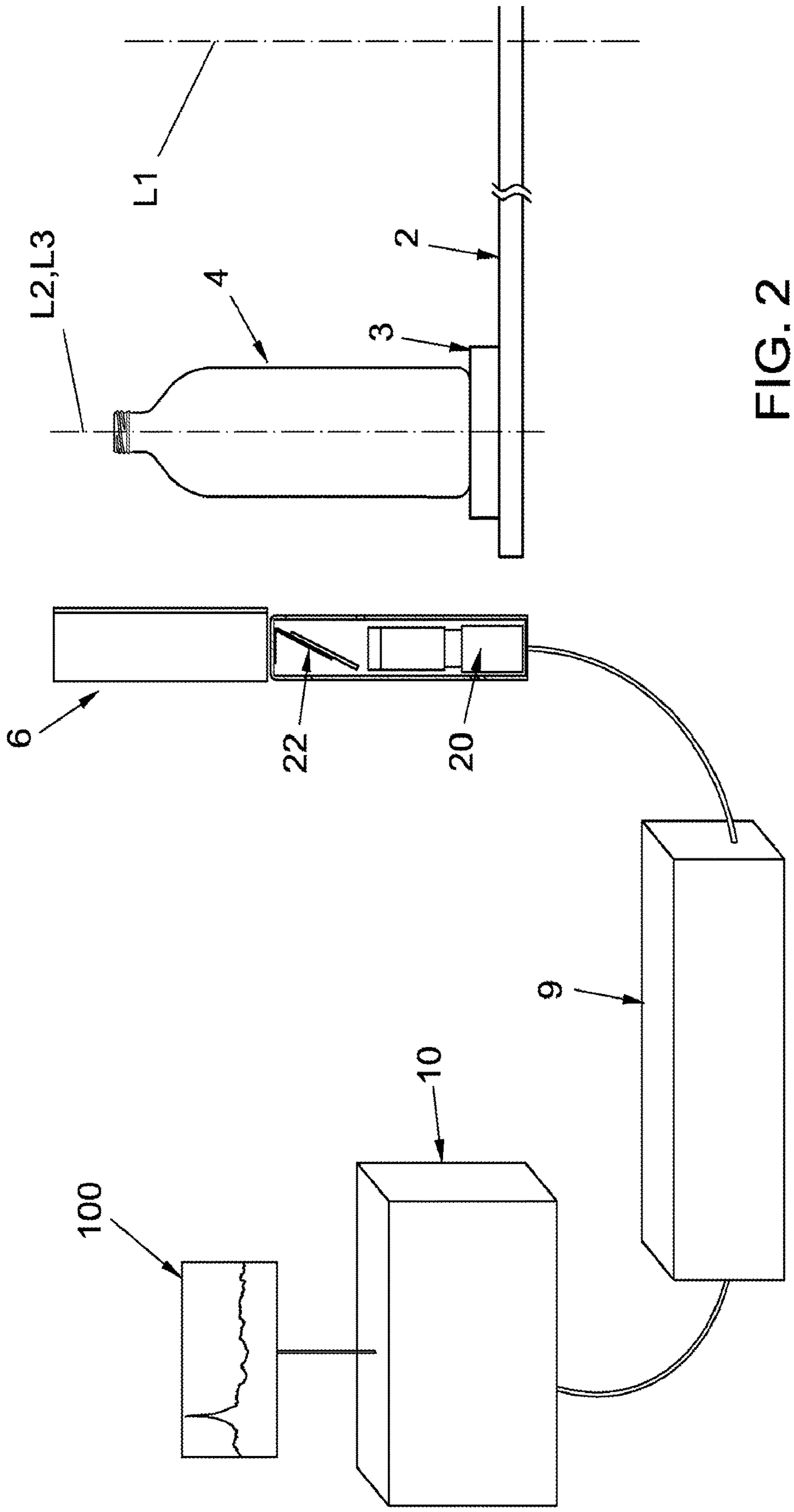
FIG. 2 is a schematic side raised view of the optical reconstruction station of the containers provided with the first filming means.

The illuminator 6, positioned perimetrically to the first carousel 2, has a projection surface in front of which the threaded neck of the containers 4 transits during the roto-revolution motion. The containers 4 expose the entire surface of the thread to the illuminator 6 during transit in front of the latter. As can be seen in FIG. 2 the optical principle used is that of the reflection of lighting on the outer surface of the container 4. In substance, the optical reconstruction station envisages the illuminator 6 and the first filming means 20 positioned on the same side of the containers 4 which transit sequentially in front of them, and a mirror 22 which redirects onto the first filming means 20 the light reflected by the container 4. The illuminator 6 emits the light from its emission surface facing towards the first carousel 2, and the emitted light hits an angular sector of the surface of the container 4 enabling it to be observed.

The processing and control means 10 further comprise a synchronization unit 9 for synchronizing the images filmed by the first filming means 20 and the angular positions of the first carousel 2 and those of the seats 3 of the containers 4.

The second carousel 2' is rotatable about a vertical axis L1' having circumferentially a second plurality of seats 3' each supporting a corresponding cap 4' oriented with a vertical axis L2'.

Each seat 3' rotates about its own axis L3' also vertical and coinciding with L2', or a relevant means can be provided for the rotation of the caps 4' about themselves so that each cap 4' has a roto-revolution movement imparted thereon during which it maintains its axis with a vertical orientation.

In a predefined zone of the second carousel 2' there is an optical reconstruction station, having second filming means 20' for filming multiple sequential images of the individual cap 4' during its roto-revolution motion.

In general, the optical reconstruction station can be formed by one or more artificial viewing devices, provided with one or more illuminators, which produce reflected and/or transmitted light (rear illumination).

In particular, the illuminators must be positioned with respect to the cap with an angle of incidence adapted to maximize the amount of light reflected by the angular sector of the inner surface, in the thread zone.

In the solution illustrated purely by way of example, a single fixed illuminator 6' is provided and the second filming means 20' comprises a camera with a fixed reference frame. The illuminator 6', positioned perimetrically to the second carousel 2', has a projection surface in front of which the threaded cap 4' transits during the roto-revolution motion. The caps 4' expose the entire surface of the thread to the illuminator 6' during transit in front of the latter. The optical principle used is that of the reflection of lighting on the outer surface of the cap 4'. In substance, the optical reconstruction station envisages the illuminator 6' and the second filming means 20' positioned on the same side of the caps 4' which transit sequentially in front of them, and a mirror 22' which redirects onto the second filming means 20' the light reflected by the cap 4'. The illuminator 6' emits the light from its emission surface facing towards the second carousel 2', and the emitted light hits an angular sector of the surface of the cap 4 enabling it to be observed.

The processing and control means 10' further comprise a synchronization unit 9' for synchronizing the images filmed by the second filming means 20' and the angular positions of the second carousel 2' and those of the seats 3' of the caps 4'.

In the following description it is assumed that the first carousel 2 and the second carousel 2' are the two carousels of the station where the capping takes place and in this case in the second carousel 2' the seats 3' are necessarily rotating on themselves so as to act as capping heads adapted to impart on the caps 4' housed therein a rotation about their own vertical axis, with the aim of performing the closing of the containers 4.

However, the first carousel 2 and the second carousel 2' may also be different carousels from those of the station where the capping takes place.

In that case the processing and control means 10, 10' are obviously able to uniquely track the time space evolution of the calculated angular position of the threads of the containers 4 and of the caps 4' until their final transfer to the station positioned downstream where the capping takes place.

The station where the capping takes place is in turn formed by two carousels rotating in a synchronized way about a common vertical axis, the lower carousel having circumferential seats where the containers 4 can be transferred, the upper carousel having circumferential seats where the caps 4' can be transferred, the upper seats being vertically aligned with the lower seats.

The caps 4' and the containers 4 are then transferred to the two carousels of the station where the capping takes place with known angular positions of their threads which determine the magnitude of the rotation of the upper seats acting as capping heads in order to have the desired closing torque.

Prior to capping the following operations are performed on the containers 4 and on the caps 4'.

Reference is initially made to the containers 4.

Each container 4 crosses Ni positions of the optical reconstruction station.

It is necessary to distinguish between three distinct steps.

1. —Learning: the invention "learns" the thread of a container 4.

In this step the carousel 2 is stationary (i.e. in a non-working position), the container 4 is subsequently arranged in each of the Ni positions identified in the field of vision of the filming device 20. In each of such Ni positions, the container is placed in rotation in the rotating seat 3 about its own axis L2 and Ri images are acquired on the complete turn of the container 4 itself, one every Aa=360°/R degrees.

Therefore, N×R images are learned.

2. —Validation: the various learnings performed during the previous step are "phased"; in this way the geometric and motion parameters are learned.

The container 4 is made to pass in front of the orientation system with the carousel 2 in working mode: the container 4 rotates according to a precise law of motion while it crosses the field filmed by the filming system 20 and N individual images are acquired in the Ni predetermined positions.

These first two steps, the learning step and the validation step, are only performed for the creation of a "job recipe" with a type of container 4 previously unknown. Let f be the operator of the processing and control means that returns a similarity value between two images, and therefore let s=f(r) be a similarity function with r∈N where 1≤r≤R, and s∈R where −1≤s≤1 the discrete function that graphs the similarity between the image of a container 4 in a defined position Ni and the population of R images learned in that defined position.

The similarity function s=f(r) therefore assumes values between −1 and 1 with the two extremes that have the meaning of null similarity and total coincidence, respectively.

The processing and control means for each container calculate N similarity functions, one for every position Ni.

Let them be $s_i=f(r_i)$ with i∈N where 1≤i≤N.

Let $S(r)=\Sigma_{i=1}^{N} f(r_i)$ be the sum function of N similarity functions. As the similarity functions each express the similarity of what has just been seen with respect to what had been previously learned, and relative to an angular sector of the container 4, the sum function expresses the entire container.

However, this may only be true in the hypothesis that the individual similarity functions are "phased" i.e. "superposable", i.e. in the hypothesis that for each r the similarity functions all express the similarity of the container rotated by the same amount, i.e. $a=r\ \Delta\alpha$.

If this hypothesis is true, let M=max(S(r)) be the maximum value assumed by the sum function of the N similarity functions.

Such value is formed at a certain $r_m$.

Therefore $M=S(r_m)$.

So $\alpha_m=r_m\bullet\Delta\alpha$ is the angle by which the container 4 is turned.

As has been seen, the recognition of the orientation of the containers 4 is based on the assumption that the similarity functions are "phased" so that it makes sense to produce the sum thereof and at the maximum of the latter the resulting angle of the container 4 can be read.

The "phasing" process of the similarity functions is called "validation".

"Validation" is the automatic process, which the processing and control means 10 perform at the end of the learning step which, by acquiring the passage of a number C of containers 4 randomly oriented, performs the necessary phasing for the subsequent working step.

Upon the passage of each of these C containers 4, which transit in the visual field of the filming device 20 exactly like in working mode N individual images are acquired and N similarity functions are calculated.

Let these similarity functions be $S_i=f(r_i)$ with

- i∈N and 1≤i≤N where N is the number of the positions, with N=1 or greater than 1
- r∈N and 1≤r≤R where R is the number of angular sample images on the turn
- s∈R and −1≤s≤1 where s is a similarity value In the event of N greater than 1, in the validation process the calculation of N−1 angular offsets is to be performed, which make it possible to superpose the N similarity functions.

The intended definition of "offset" of a similarity function is now clarified.

Let $S_i=f(r_i)$ be the i-th similarity function related to the i-th position.

The same offset function $k_i$ is:

$s_i=f(r_i-k_i)$ with

- i∈N and 1≤i≤N where N is the number of positions
- r∈N and 1≤r≤R where R is the number of angular samples on the turn
- s∈R and −1≤s≤1 where s is the similarity value
- k∈N and 1≤k≤R where R is the number of angular samples on the turn which is equivalent to a "circular shift on the domain".

Let these offsets be indicated with k: the aim of the validation is to calculate the value of offsets $<k_1, k_2, k_3 \ldots k_{N-1}>$ which enables the phasing of the similarity functions and therefore gives sense to the sum thereof.

A generic similarity function, with reference to an angular part of the container 4 in which there is unique information, generally has a "peak".

If for simplicity purposes we consider a container 4 completely covered by unique information, where all the similarity functions have a peak, the phasing of the functions means finding the series of offsets that leads all the peaks to coincide in a same value of r for all the functions.

In fact, the validation corresponds to finding the N−1 offsets which, applied to the similarity functions coming from a sufficiently wide statistical sample of containers 4, maximize the sum of all the functions, of all the positions, for all the containers.

Formally, for the generic container cj there are N similarity functions $S_{ij}=f(r-k_i)$ with $i \in N$ and $1 \leq i \leq N$ where N is the number of the positions $r \in N$ and $1 \leq r \leq R$ where R is the number of angular samples on the turn $s \in R$ and $-1 \leq s \leq 1$ where s is a similarity value $k \in N$ and $1 \leq k \leq R$ where R is the number of angular samples on the turn $j \in N$ and $1 \leq j \leq C$ where C is the number of containers used Let $S(r)_{<k1,\ k2,\ k3,\ \ldots\ kN-1>}=\Sigma_{i=1}^{C}\ (\Sigma_{i=1}^{N}\ f(r_i-k_i))$ be the space of the sum functions of all the C×N similarity functions of all the C containers for all the N positions.

That is, given a vector of offsets $<_{k1,\ k2,\ k3,\ \ldots\ kN-1}>$ a function S(r) is obtained which is a single sum similarity function of all the C×N similarity functions of all the C containers for all the N positions.

Therefore, this function shall have a maximum value at a certain r.

Let such maximum value be $M_{<k1,\ k2,\ k3,\ \ldots\ kN-1>}=\max(_{r=1}^{R}{}_{(}S(r)_{<k1,\ k2,\ k3,\ \ldots\ kN-1>}))$.

For each vector of offsets there is therefore a maximum value M: the desired offset vector is the one that produces the highest value of M.

However, the exhaustive execution of this calculation is simply impractical. In the most common practical implementation with a number of containers C=30, number of positions N=12, number of images R=resolution=360 images on the turn, the general complexity of the calculation is as follows:

$$\max(_{r=1}^{R}S(r)_{<k1,k2,k3,\ \ldots\ kN-1>})=\max(_{r=1}^{R}(\Sigma_{i=1}^{C}(\Sigma_{i=1}^{N}f(r_i-k_i))))$$

This involves performing $360^{11}$ calculations of the function S(r), then extracting the maximum value for all 360 values of r of the domain: the typical complexity of this calculation is therefore in the order of $360^{12}$ iterations. Therefore, an integral part of this invention is a strategy for calculating the N−1 offsets that enable the complexity of the calculation itself to be reduced.

Such strategy is based on the partial sums of the positions.

A first reference position rl is chosen, for which the similarity functions shall not be offset, while a second reference position r2 is offset by all the possible R values.

Let $S(r)_{<k1>}=\Sigma_{i=1}^{C}(f(r_2-k_1)+f(r_1))$ be a population of S(r), each for a different value of the offset $k_1$.

For each of these functions the value Max M is found, and $k_1$ is chosen at the maximum value M found, which could be $k_{1\_ok}$.

In this way, what has been performed is the calculation of the best offset $k_1$ which maximizes the sum of the similarity functions of the first two positions r1 and r2.

Gradually and in the same way, after blocking the offset between the first two positions r1 and r2, the sum of the first three is calculated for all the possible offsets $k_2$ of the third position r3:

$S(r)_{<k2>}=\Sigma_{i=1}^{C}\ (f(r_3-k_2)+f(r_2-k_{1\_ok})+f(r_1))$, and in the same way, the offset $k_{2\_ok}$ is selected which lets the highest value to reach the maximum value M of the function S(r).

Likewise, the process is repeated for all the subsequent positions:

$S(r)_{<k3>}=\Sigma_{i=1}^{C}\ (f(r_4-k_3)+f(r_3-k_{2\_ok})+f(r_2-k_{1\_ok})+f(r_1))$, until the complete calculation of the vector of offsets:

$$<k_{1\_ok}, k_{2\_ok}, k_{3\_ok}\ \ldots\ k_{(N-1)\_ok}>$$

The "validation" process performed by the processing and control means, i.e. the calculation of the N−1 angular offsets (expressed in sampling units r, which coincide with a degree in the case of sampling 360 images, with half a degree in the case of 720 images, etc.) in short enables the system to find out:

geometry of the container thread;

relative geometry of the container thread-filming device-illuminator;

position of the different filming points of the container thread;

initial learning angle of the container thread in each filming point;

roto-revolution movement that the container thread performs within the field framed by the filming device during the working step;

At the end of this process the containers 4 are ready for the capping job.

3. —Job: in the corresponding carousel of the station where the capping takes place or in the same carousel if they coincide, as a function of the job, each container 4 in transit, with roto-revolution motion and which reaches the field framed by the filming device 20 with a random angle, is photographed N times, typically only once in each of the Ni positions established and known.

The preferred case in which N=1 will now be discussed.

The graph of similarity between the Ni current photos and the Ni populations preliminarily learned during the learning in each position is plotted by the processing and control means. The maximum peak is formed at a certain angle $\alpha_m$.

Such certain angle $\alpha_m$ is the angle that is communicated by the management and control system 10 to the motorized system that handles the capping head.

In practice: during the working step, upon the transit of a container 4 that does not rotate on itself within the field framed by the filming device 20, the same container is photographed in one position.

Each current photograph filmed coming from the Ni positions is compared by the processing and control means with the R images preliminarily learned in that same position of the Ni positions in the learning step, and the processing and control means draw a similarity function.

Such function, if the image to which it relates contains useful information for detecting the orientation of the container, will contain a "peak".

All the similarity functions relative to images containing unique information for the purposes of detecting the orientation of the container contain a peak.

The capping of the container is therefore performed considering the angle $\alpha_m$. Reference is now made to the caps 4' which are subject to similar operations. Each cap 4' crosses Ni positions of the optical reconstruction station.

The processing and control means 10' perform with the same methodology the same three steps mentioned above with reference to the containers.

1. —Learning: the invention "learns" the thread of a cap 4'.

In this step the second carousel 2' is stationary (i.e. in a non-working position), the cap 4' is subsequently arranged in each of the Ni' positions identified in the field of vision of the filming device 20. In each of such Ni' positions, the cap 4' is placed in rotation by the rotating seat 3' about its own axis L2' and Ri' images are acquired on the complete turn of the cap 4' itself, one every $\Delta\alpha'=360°/R'$ degrees.

Therefore, N'×R' images are learned.

The learning step is performed in a very similar way to that envisaged for the containers and shall not therefore be described further.

2. —Validation: the various learnings performed during the previous step are "phased"; in this way the geometric and motion parameters are learned.

The cap 4' is made to transit in front of the orientation system with the carousel 2' in working mode: the cap 4' rotates according to a precise law of motion while it transits through the field framed by the filming system 20' and N' individual images are acquired in the Ni' predetermined positions.

The validation step is performed in a very similar way to that envisaged for the containers and shall not therefore be described further.

At the end, the angle $\alpha'_m$ through which the cap 4' is rotated is obtained.

The "validation" process, i.e. the calculation of the N−1 angular offsets (expressed in sampling units r', which coincide with a degree in the case of sampling 360 images, with half a degree in the case of 720 images, etc.) in short enables the system to find out:

- geometry of the cap thread;
- relative geometry of the cap thread-filming device-illuminator;
- position of the different filming points of the cap thread;
- initial learning angle of the cap thread in each filming point;
- roto-revolution movement that the cap thread performs within the field framed by the filming device during the working step;

At the end of this process the caps 4' are ready for the capping work.

3. —Work: in the corresponding carousel of the station where the capping takes place or in the same carousel if they coincide, as a function of the work, each cap 4' in transit which reaches the field framed by the filming device 20' with a random angle, is photographed N' times, in each of the Ni' positions established and known.

The preferred case in which N'=1 will now be considered.

The graph of similarity between the Ni' current photos and the Ni' populations preliminarily learned during the learning in each position is plotted. The maximum peak is formed at a certain angle $\alpha_m$ which is communicated by the management and control system 10' to the motorized system that handles the capping head. In practice: during the working step, upon the transit of a cap 4' within the field framed by the filming device 20', the same cap 4' is photographed in one position. Each current photograph filmed coming from the Ni' positions is compared with the R' images preliminarily learned in that same position of the Ni' positions in the learning step, and a similarity function is drawn.

Such a function, if the image to which it relates contains useful information for detecting the orientation of the container, will contain a "peak".

All the similarity functions relative to images containing unique information for the purposes of the orientation contain a peak.

The capping of the container is therefore performed considering the angle $\alpha'_m$. Advantageously the processing and control means 10, 10' with the calculated value $\alpha'_m$ of the current angular position of the thread of the cap and the calculated value $\alpha_m$ of the current angular position of the thread of the corresponding container calculate the rotation stroke required of the screwing means for closing the container with a predetermined closing torque.

In particular the processing and control means 10, 10' associate a first rotation speed of the screwing means with an initial part of their calculated rotation stroke and a second rotation speed of the screwing means lower than the first rotation speed at a final part of their calculated rotation stroke for the precise control of said predetermined closing torque.

A device for the orientation of containers as conceived herein is susceptible of numerous modifications and variants, all falling within the scope of the inventive concept; further, all the details are replaceable by technically equivalent elements. In practice, all the materials used, as well as the dimensions, can be of any kind, according to the needs and the state of the art.

The invention claimed is:

1. A capping apparatus adapted to apply caps provided with a thread to the neck of containers, the capping apparatus comprising:

a first rotatable carousel having circumferentially a first plurality of seats where the containers can be housed with random orientation of their thread, a second rotatable carousel having circumferentially a second plurality of seats where the caps can be housed with random angular orientation of their thread, an optical reconstruction station having:

- a first filming means for filming images having a first framing field oriented on the thread of the containers in sequential transit through said first framing field,
- a second filming means for filming images having a second framing field oriented on the thread of the caps in sequential transit through said second framing field, a processing and control means adapted to:

- acquire from said first and second filming means at least one current image of the thread of the container in transit through said first filming field and at least one current image of the thread of the cap in transit through said second framing field,
- calculating a current value of an angular position of the thread of said cap in transit through said second framing field and a current value of an angular position of the thread of said container in transit through said first framing field,
- comparing said at least one current image with an optical reconstruction thereof preliminarily learned, and
- programming the operation of the screwing means with the calculated value of the current angular position of the thread of the cap in transit through said second framing field and the calculated value of the current angular position of the thread of the container in transit through said first framing field, where the preliminary optical reconstruction of the thread of the cap is learned by said processing and control means by acquiring through said second filming means a number of multiple sequential images of the thread of the cap in 360° rotation on the axis of the cap and in the seat of the cap of the second carousel starting from a random angular orientation, for a number of positions of the cap inside the second framing field while the second carousel is stationary, and where for learning the preliminary optical reconstruction of the thread of the container, said processing and control means acquire through said first filming means a number of multiple sequential images of the thread of the container in 360° rotation on the axis of the cap and in the seat the cap of the first carousel starting from a random angular orientation, for a number of positions in which the container s inside the first framing field while the first carousel is stationary, and wherein in order to calculate said current value of the angular position of the thread of the cap in transit, said processing and control means acquire from said second filming means a single current image of the thread of the cap in transit while said second carousel rotates, and processes a similarity function between said current image and the preliminary optical reconstruction of the thread of the cap.

2. The capping apparatus according to claim 1, wherein said processing and control means with the calculated value of the current angular position of the thread of the cap and the calculated value of the current angular position of the thread of the corresponding container calculate the rotation stroke required of the screwing means for closing the container with a predetermined closing torque.

3. The capping apparatus according to claim 2, wherein said processing and control means associate a first rotation speed of the screwing means with an initial part of calculated rotation stroke and a second rotation speed of the screwing means lower than the first rotation speed with a final part of their calculated rotation stroke for the precise control of said predetermined closing torque.

4. The capping apparatus according to claim 1, wherein said first and/or second filming means comprise cameras adapted to allow a mechanism of filming sequential images with successive cuttings of the sensor, the successive cuttings being set to withdraw only the portion of pixels where said container and/or cap is located, from time to time, during the advancement.

5. A capping apparatus adapted to apply caps provided with a thread to the neck of containers, the capping apparatus comprising:

a first rotatable carousel having circumferentially a first plurality of seats where the containers can be housed with random orientation of their thread, a second rotatable carousel having circumferentially a second plurality of seats where the caps can be housed with random angular orientation of their thread, an optical reconstruction station having:

- a first filming means for filming images having a first framing field oriented on the thread of the containers in sequential transit through said first framing field,
- a second filming means for filming images having a second framing field oriented on the thread of the caps in sequential transit through said second framing field, a processing and control means adapted to:

- acquire from said first and second filming means at least one current image of the thread of the container in transit through said first filming field and at least one current image of the thread of the cap in transit through said second framing field,
- calculating a current value of an angular position of the thread of said cap in transit through said second framing field and a current value of an angular position of the thread of said container in transit through said first framing field,
- comparing said at least one current image with an optical reconstruction thereof preliminarily learned, and
- programming the operation of the screwing means with the calculated value of the current angular position of the thread of the cap in transit through said second framing field and the calculated value of the current angular position of the thread of the container in transit through said first framing field, where the preliminary optical reconstruction of the thread of the cap is learned by said processing and control means by acquiring through said second filming means a number of multiple sequential images of the thread of the cap in 360° rotation on the axis of the cap and in the seat of the cap of the second carousel starting from a random angular orientation, for a number of positions of the cap inside the second framing field while the second carousel is stationary, and where for learning the preliminary optical reconstruction of the thread of the container, said processing and control means acquire through said first filming means a number of multiple sequential images of the thread of the container in 360 rotation on the axis of the cap and in the seat the cap of the first carousel starting from a random angular orientation, for a number of positions in which the container s inside the first framing field while the first carousel is stationary, and wherein in order to calculate said current value of the angular position of the thread of the container in transit, said processing and control means acquire from said first filming means a single current image of the thread of the container in transit while said first carousel rotates, and processes a similarity function between said current image and the preliminary optical reconstruction of the thread of the container.

6. A capping method utilizing the capping apparatus according to claim 1, wherein the caps provided with a thread are screwed to the neck provided with a thread of container, wherein the containers are housed with random angular orientation of their thread in a first plurality of seats present circumferentially in a first rotatable carousel, the caps are housed with random angular orientation of their thread in a second plurality of seats present circumferentially in a second rotatable carousel, wherein the method comprises:

- acquiring at least one current image of the thread of the container in transit through a first framing field and at least one current image of the thread of the cap in transit through a second framing field,
- calculating a current value of the angular position of the thread of said cap in transit through said second framing field and a current value of the angular position of the thread of said container in transit through said first framing field by comparing said at least one current image thereof with an optical reconstruction preliminarily learned, and
- programming the screwing operation with the calculated value of the current angular position of the thread of the cap in transit through said second framing field and the calculated value of the current angular position of the thread of the container in transit through said first framing field.

7. The capping method according to claim 6, wherein, with the calculated value of the current angular position of the thread of the caps in transit through said second framing field and the calculated value of the current angular position of the thread of the containers in transit through said first framing field, the rotation stroke required for closing the containers with a predetermined closing torque is calculated.

* * * * *